United States Patent
Kuroda et al.

(10) Patent No.: US 7,819,392 B2
(45) Date of Patent: Oct. 26, 2010

(54) POSITIONING AND CLAMPING DEVICE AND POSITIONING DEVICE

(75) Inventors: Takayuki Kuroda, Itami (JP); Takayuki Munechika, Itami (JP)

(73) Assignee: Pascal Engineering Corporation, Hyogo (JP)

( * ) Notice: Subject to any disclaimer, the term of this patent is extended or adjusted under 35 U.S.C. 154(b) by 739 days.

(21) Appl. No.: 11/596,438

(22) PCT Filed: May 19, 2004

(86) PCT No.: PCT/JP2004/006751

§ 371 (c)(1),
(2), (4) Date: Nov. 14, 2006

(87) PCT Pub. No.: WO2005/110671

PCT Pub. Date: Nov. 24, 2005

(65) Prior Publication Data

US 2008/0061486 A1 Mar. 13, 2008

(51) Int. Cl.
*B23Q 3/14* (2006.01)
(52) U.S. Cl. .................................. 269/309; 269/310
(58) Field of Classification Search ............... 269/309, 269/310, 900
See application file for complete search history.

(56) References Cited

U.S. PATENT DOCUMENTS

| 6,527,266 | B1 * | 3/2003 | Yonezawa et al. ........... 269/309 |
| 6,955,347 | B2 * | 10/2005 | Kawakami et al. .......... 269/309 |
| 2007/0170630 | A1 * | 7/2007 | Kuroda et al. ............... 269/309 |
| 2008/0061486 | A1 * | 3/2008 | Kuroda et al. .............. 269/48.1 |

FOREIGN PATENT DOCUMENTS

| JP | 8-155770 | 6/1996 |
| JP | 2001-038564 | 2/2001 |
| JP | 2003-039264 | 2/2003 |
| WO | WO-03/009964 | 2/2003 |

\* cited by examiner

*Primary Examiner*—Lee D Wilson
(74) *Attorney, Agent, or Firm*—Jordan and Hamburg LL

(57) ABSTRACT

A positioning mechanism in a positioning and clamping device includes an annular tapered surface that is formed on an outer periphery of a cylindrical shaft for positioning a pallet in the horizontal direction, and has a decreasing diameter toward an axial tip of the cylindrical shaft. An annular engaging mechanism, which is formed on an inner periphery side portion of an annular engagement member, is engageable with the annular tapered surface, and is elastically deformed in the radial direction, as a result of engagement with the annular tapered surface. The engaging mechanism has a tapered ring portion, which makes a face contact with the annular tapered surface, and multiple ribs extending outward, radially, from the tapered ring portion.

11 Claims, 7 Drawing Sheets

POSITIONING AND CLAMPING DEVICE AND POSITIONING DEVICE

TECHNICAL FIELD

The present invention relates to a positioning and clamping device for positioning and clamping a clamping object to a base, and a positioning device for positioning a clamping object relative to a base member.

BACKGROUND OF THE RELATED ART

Patent Document 1: Japanese Laid-Open Patent Application No. 2001-38564;
Patent Document 2: Japanese Laid-Open Patent Application No. H08-155770;
Patent Document 3: Japanese Laid-Open Patent Application No. 2003-39264.

In general, a machining tool, such as a machining center, has a machining table. A work pallet is positioned and clamped to the machining table, and a work piece clamped on the work pallet is machined. Some of precision machinery components require a machining accuracy of approximately 1 μm. An error in positioning the work pallet relative to the table affects the machining accuracy of the work piece. In other words, the positioning accuracy of the pallet relative to the table is extremely important. Various devices for positioning and clamping the pallet to a base member fixed to the table, or to the table itself as the base, have been proposed and put into practical use.

A clamping device having a datum function disclosed in Japanese Laid-Open Patent Application No. 2001-38564 (Patent Document 1) has a cylindrical shaft projecting from the base. A tapered collet is fitted slidably onto the cylindrical shaft, and the tapered collet is pressed elastically upward by a spring. The work pallet has an annular bushing capable of being fitted onto the cylindrical shaft. With the bushing fitted onto the cylindrical shaft, the pallet is pulled down and clamped to the base by a clamping mechanism. The tapered collet is fitted tightly in between the cylindrical shaft and an annular tapered surface of the bushing, whereby the pallet is positioned in the horizontal direction relative to the base. Further, a horizontal surface of the bushing abuts a receiving surface of the base from above, whereby the work pallet is positioned in the vertical direction in relation to the base.

A seating device for the pallet disclosed in Japanese Laid-Open Patent Application No. H08-155770 (Patent Document 2) have a tapered cone projecting from a base member. The pallet has a tapered socket capable of being fitted onto the tapered cone, and an annular groove for facilitating elastic deformation is formed on the inner periphery of the tapered cone. With the tapered socket being fitted onto the tapered cone, the pallet is pulled down and clamped to the base by a clamping mechanism. The tapered socket is engaged tightly with the tapered cone while the tapered cone is subject to slight elastic deformation for radial contraction and pressed tightly against the annular tapered surface of the tapered socket, by which the pallet is positioned in the horizontal direction relative to the base. Further, a horizontal surface of the tapered socket abuts a receiving surface of the tapered cone from above, whereby the pallet is positioned in the vertical direction in relation to the base.

A work pallet positioning and clamping device disclosed in Japanese Laid-Open Patent Application No. 2003-39264 (Patent Document 3) has a cylindrical shaft projecting from the base. The pallet has an annular bushing capable of being fitted onto the cylindrical shaft. The bushing has a nearly annular engaging mechanism that is elastically deformable in the radial direction, on the inner periphery, and an annular escape groove, for allowing for the elastic deformation of the engaging portion, on the outer periphery. Further, multiple slits are formed on the annular engaging mechanism. With the bushing being fitted on the cylindrical shaft, the pallet is pulled down and clamped to the base by a clamping mechanism. The engaging portion of the bushing is engaged with the cylindrical shaft, while the engaging mechanism of the bushing is elastically deformed outward, radially, toward the annular escape groove, and pressed against on annular tapered surface of the cylindrical shaft, whereby the pallet is positioned in the horizontal direction in relation to the base. Further, a horizontal surface of the bushing abuts a receiving surface of the base from above, whereby the pallet is positioned in the vertical direction relative to the base.

In the clamping mechanisms of Patent Documents 1 and 3, a power output member is introduced in the axial bore of the cylindrical shaft. Multiple, radially movable steel balls are held radial holes formed in the top part of the cylindrical shaft. When the power output member is pulled down, the multiple steel balls are pushed outward, radially, by a slanted surface on top part of the power output member. The steel balls are engaged with a annular engaging surface formed in the bushing, whereby a clamping force for pulling down and clamping the pallet to the base is produced. Several steel balls (for example, six) are used, so that a significantly large force is exerted on the annular engaging surface when the steel balls are engaged.

However, the devices of Patent Documents 1 to 3 have the following problems:

In the clamping device having a datum function of Patent Document 1, the tapered collet and the cylindrical shaft are formed separately. The tapered collet is fitted slidably onto the cylindrical shaft, pressed elastically upward by a spring, and stopped by a stopper ring. The structure having such a tapered collet increases the number of parts, thereby increasing production costs. Repeated use of the clamping device causes the cylindrical shaft and tapered collet to wear out at the sliding part, and, further, accumulated abrasion powder may significantly reduce positioning accuracy. In addition, there is a small gap between the cylindrical shaft and the tapered collet, thus machining oil and cutting powder entering that gap may significantly reduce positioning accuracy.

In the seating device, for the work pallet of Patent Document 2, the tapered cone is elastically deformed for radial contraction. The tapered cone has a relatively thick, annular continuous wall. Therefore, it is difficult for the tapered cone to be elastically deformed for radial contraction. In other words, its radial contraction is so small that the tapered cone and tapered socket has to be produced with high production accuracy in order for the surface of the tapered socket to abut the receiving tapered surface of the tapered cone, which makes the entire device expensive. By increasing the force of the clamping mechanism, the tapered cone can be subject to large elastic deformation for radial contraction. However, upon receiving such a significant force, the annular tapered surface of the tapered cone tends to partially wear out, failing to ensure prolonged positioning accuracy. Further, when the tapered cone is subject to large elastic deformation for radial contraction, the elastic part experiences excessive stress. The elastically deformed part may not be restored to its proper shape, and the deformation may become permanent.

In the positioning and locking device disclosed in Patent Document 3, the annular engaging mechanism of the bushing has, on its outer periphery, an annular escape groove that allows for the elastic deformation of the engaging mechanism, and, further, multiple slits, so that the engaging mechanism is easily elastically deformed outward, radially. However, if the engaging mechanism is engaged with the cylindrical shaft for pulling down and clamping the pallet to the base before the central axes of the cylindrical shaft and bushing are not aligned (for example with a slight misalignment), the engaging mechanism is, as a result of the engagement, subject to localized elastic deformation, and pressed against the annular tapered surface without the central axes of the cylindrical shaft and bushing being aligned. Thus, in this state, the pallet may be clamped to the base. In other words, when the pallet carries a heavy load, the pallet may not be reliably or highly accurately positioned in the horizontal direction relative to the base.

Further, in the clamping mechanisms in Patent Documents 1 and 3, when the annular engaging surface of the bushing have an annular tapered surface, with which multiple steel balls are engaged for clamping, the steel balls make contact at a point with the annular tapered surface. This small contact area causes the annular tapered surface to receive a significant localized force. Therefore, particularly when a significant clamping force is applied, the steel balls may form trace of point contact on the annular tapered surface, subsequently, receives an uneven clamping force as the pallet is used repeatedly. It may therefore become difficult to maintain stable clamping. In such cases, the steel balls can be increased in size or number, however, such attempts result in enlarging the clamping device and are disadvantageous in terms of production cost.

There is also a demand for increased positioning accuracy in positioning and clamping a metal mold to a base, such as a movable or fixed board of a press machine or injection molding machine. When the devices of Patent Documents 1 to 3 are used, the same problems, as described above, occur.

The object of the present invention is to provide a positioning and clamping device that improves positioning accuracy in positioning a clamping object relative to a base member, decreases the number of components for reduced cost, and maintains high positioning accuracy and stable clamping after prolonged and repeated use, particularly by providing an annular engaging mechanism, which is elastically deformable in the radial direction, to a cylindrical shaft of the base member, or an annular engagement member of the clamping object, with the engaging mechanism having part and multiple ribs.

SUMMARY OF THE INVENTION

The positioning and clamping device of the present invention is a positioning and clamping device comprising a clamping mechanism that pulls down and clamps a clamping object such as a work pallet for fitting a work piece to be machined or a metal mold, to a base member, and a positioning mechanism that positions the clamping object in the horizontal and vertical directions in relation to the base member, characterized by that: the positioning and clamping device further comprises a protruding cylindrical shaft provided on the base member, and an annular engagement member provided on the clamping object so as to be capable of being fitted on the cylindrical shaft; the positioning mechanism comprises: an annular tapered surface that is formed on an outer periphery of the cylindrical shaft for positioning the clamping object in the horizontal direction, and has a decreasing diameter toward an axial tip of the cylindrical shaft, and an annular engaging mechanism that is formed on an inner periphery side portion of the annular engagement member, so as to be capable of engaging with the annular tapered surface and of elastically deforming in the radial direction, in an engaged state with the annular tapered surface; and the engaging mechanism has a tapered ring portion capable of making a face contact with the annular tapered surface, and multiple ribs extending outward, radially, from the tapered ring portion.

In this positioning and clamping device, with the annular engaging mechanism attached to the clamping object being fitted on the protruding cylindrical shaft provided on the base, the clamping object is pulled down and clamped to the base by the clamping mechanism, while the clamping object is positioned in relation to the base, in the horizontal and vertical directions, by the positioning mechanism. In the positioning mechanism, an annular tapered surface, having a decreasing diameter toward the axial tip of the cylindrical shaft, is formed on the outer periphery of the cylindrical shaft, and an annular engaging mechanism is provided on the inner periphery side portion of the annular engagement member to engage with the annular tapered surface. When the clamping object is pulled down and clamped to the base by the clamping mechanism, the annular engaging mechanism is elastically deformed outward, radially, for radial expansion, and pressed tightly against the annular tapered surface, whereby the clamping object is positioned in the horizontal direction in relation to the base. Here, the horizontal positioning surfaces formed on the base and the annular engagement member abut each other, whereby the clamping object is positioned in the vertical direction in relation to the base.

The engaging mechanism has a tapered ring portion that makes a face contact with the annular tapered surface, and multiple ribs extending outward, radially, from the tapered ring portion. When the clamping object is pulled down and clamped to the base by the clamping mechanism, the spaces created on the outer side of the tapered ring portion between the multiple ribs facilitate the elastic deformation of the engaging mechanism, and the multiple ribs are compressively elastically deformed, whereby the entire tapered ring portion is enlarged. Therefore, it is ensured that the engaging mechanism is elastically deformed outward, radially, in engagement with the cylindrical shaft, and the tapered ring portion is pressed against the annular tapered surface of the cylindrical shaft. Particularly, the multiple ribs provide appropriate rigidity to the engaging mechanism. If the engaging mechanism is engaged with the cylindrical shaft for the clamping mechanism to pull down and clamp the clamping object to the base, without the central axes of the cylindrical shaft and annular engagement member being aligned, the central axes of the cylindrical shaft and annular engagement member are aligned as a result of the engagement before the engaging mechanism is elastically deformed. In this case, the engaging mechanism is elastically deformed and pressed against the annular tapered surface.

Consequently, a heavy clamping object can be positioned relative to the base with increased accuracy. With the engaging mechanism being formed integrally with the annular engagement member, the number of parts is decreased. Further, the large elastic deformation amount allows for increased production error tolerance. Therefore, production costs can be reduced. In addition, abrasion that adversely affects the positioning accuracy is reduced, functional deterioration due to machining oil and cutting powder associated with machining is prevented, and high positioning accuracy is maintained for prolonged and repeated use.

Alternatively, the positioning and clamping device of the present invention is a positioning and clamping device comprising a clamping mechanism that pulls down and clamps a clamping object such as a work pallet for fitting a work piece to be machined or a metal mold to a base member, and a positioning mechanism that positions the clamping object in the horizontal and vertical directions in relation to the base member, characterized by that: the positioning and clamping device further comprises a protruding cylindrical shaft provided on the base member, and an annular engagement member provided on the clamping object so as to be capable of being fitted on the cylindrical shaft; the positioning mechanism comprises: an annular tapered surface that is formed on an inner periphery of the annular engagement member for positioning the clamping object in the horizontal direction, and has a decreasing diameter toward an axial tip of the cylindrical shaft, and an annular engaging mechanism that is formed on an outer periphery side portion of the cylindrical shaft, so as to be capable of engaging with the annular tapered surface and of elastically deforming in the radial direction, in a engaged state with the annular tapered surface; and the engaging mechanism has a tapered ring portion capable of making a face contact with the annular tapered surface, and multiple ribs extending inward, radially, from the tapered ring portion.

In the positioning mechanism of this positioning and clamping device, an annular tapered surface having a decreasing diameter toward the axial tip of the cylindrical shaft is formed on the inner periphery of the annular engagement member, and an engaging mechanism is formed on the outer periphery side portion of the cylindrical shaft to engage with the annular tapered surface. When the clamping object is pulled down and clamped to the base, the annular engaging mechanism is elastically deformed inward, radially, for radial contraction, and pressed against the annular tapered surface. The engaging mechanism has a tapered ring portion that makes a face contact with the annular tapered surface and multiple ribs extending inward, radially, from the tapered ring portion. The spaces created on the inner side of the tapered ring portion between the multiple ribs facilitate the elastic deformation of the engaging mechanism. The multiple ribs are compressively elastically deformed and the entire tapered ring portion is contracted, whereby it is ensured that the engaging mechanism is elastically deformed for radial contraction. For the rest, the same advantages and efficacy as the invention described above can be obtained.

In above described positioning and clamping devices, the clamping mechanism comprises: a power output member being inserted in an axial bore of the cylindrical shaft; multiple steel balls that are radially movably held in multiple retention holes, respectively, of the cylindrical shaft; multiple engagement recesses formed in the annular engagement member so that the multiple steel balls can make a face contact or a line contact with them, when the annular engagement member is fitted on the cylindrical shaft; a clamping drive means that moves the power output member away from the clamping object, so that the multiple steel balls are engaged with the multiple engagement recesses respectively, to clamp the clamping object to the base member; and an unclamping means that moves the power output member toward the clamping object, so that the multiple steel balls are disengaged from the multiple engagement recesses respectively, to unclamp the clamping object from the base member.

When the power output member is moved away from the clamping object by the clamping drive means, with the annular engagement member attached to the clamping object being fitted on the cylindrical shaft attached to the base, the multiple steel balls held in the cylindrical shaft are pushed outward, radially, by the power output member, and make a face or line contact with the multiple engagement recesses, respectively, whereby the clamping object is pulled down and clamped to the base. In this state, when the power output member is moved toward the clamping object by the unclamping means, the multiple steel balls are retracted inward, radially, and disengaged from the multiple engagement recesses of the annular engagement member, whereby the clamping object can be unclamped from the base. In the clamped state, a significantly large force is applied to the engagement recesses with which the steel balls are engaged, and the steel balls are in a face, or line contact with the respective engagement recesses. Compared with a point contact, the steel balls have a larger contact area with the engagement recesses, and the engagement recesses do not have even a trace of contact with the steel balls, so that stable clamping can be maintained for prolonged and repeated use.

The positioning device of the present invention positions a clamping object such as a work pallet for fitting a work piece to be machined or a metal mold, relative to a base member, characterized by that the positioning device comprises: a protruding shaft provided on the base member; an annular engagement member provided on the clamping object, so as to be fitted on the shaft; an annular tapered surface that is formed on the outer periphery of the shaft for positioning the clamping object in the horizontal direction and has a decreasing diameter toward the axial tip of the shaft; and an annular engaging mechanism that is formed on an inner periphery side portion of the annular engagement member, so as to be capable of engaging with the annular tapered surface and of elastically deforming in the radial direction, in an engaged state with the annular tapered surface; and that the engaging mechanism has a tapered ring portion capable of making a face contact with the annular tapered surface, and multiple ribs extending outward, radially, from the tapered ring portion.

The clamping object, which is positioned in relation to the base by the positioning device, is clamped to the base by a clamping device provided as a part of, or separately from, this positioning device. This positioning device basically has the same advantages and efficacy as the positioning mechanism of above described positioning and clamping devices. The structure comprising an annular tapered surface that is formed on the inner periphery of the annular member for positioning the clamping object in the horizontal direction, and has a decreasing diameter toward the axial tip of the shaft, and an annular engaging mechanism that is formed on the outer periphery side portion of the shaft to engage with the annular tapered surface, and is elastically deformed in the radial direction as a result of engagement with the annular tapered surface, wherein the engaging mechanism has a tapered ring portion that makes a face contact with the annular tapered surface and multiple ribs extending inward, radially, from the tapered ring portion, can be used. This positioning device can have the same structures as devices above described.

DETAILED DESCRIPTION OF THE PREFERRED EMBODIMENTS

Figure 1:
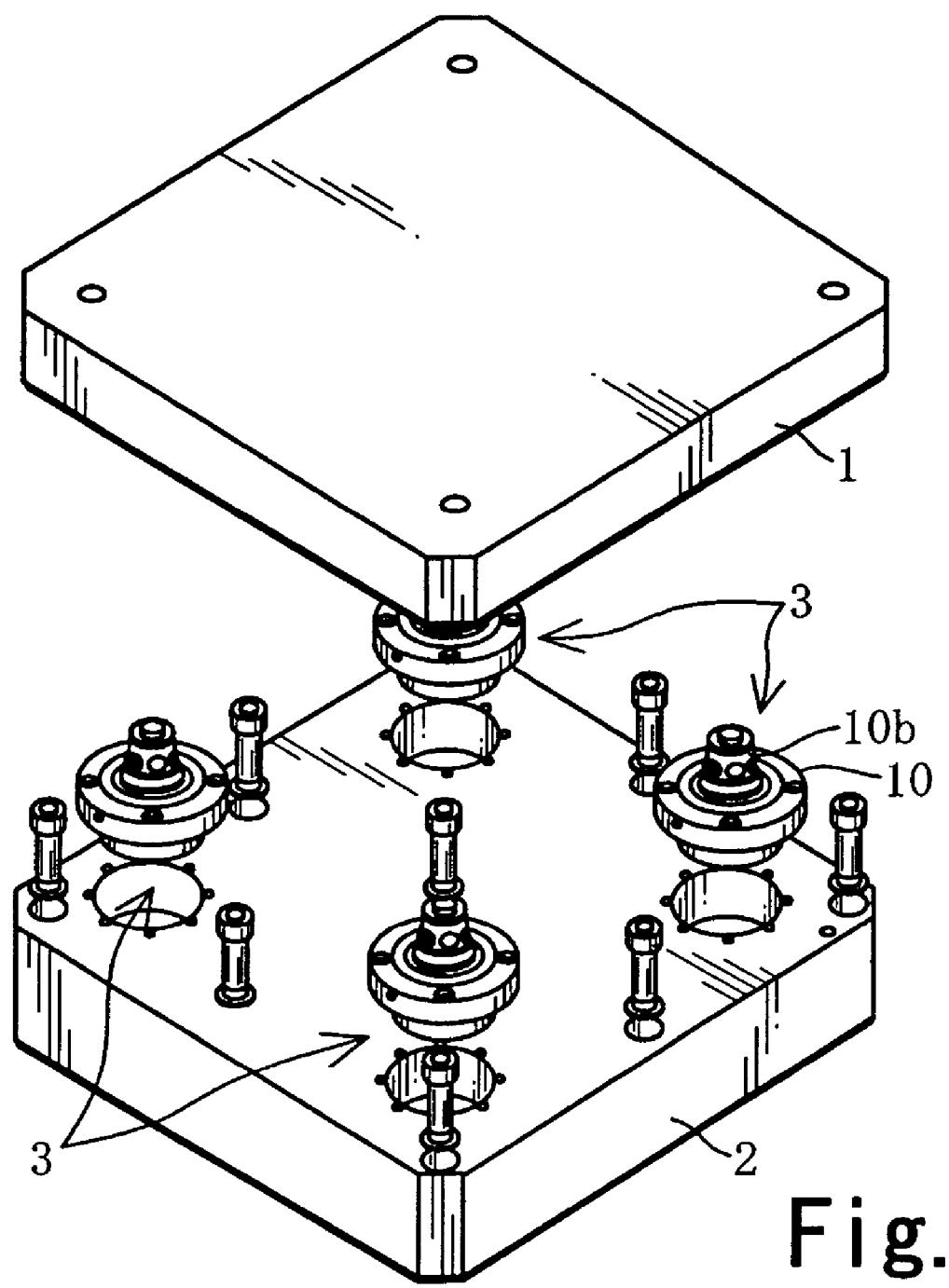
FIG. 1 is a perspective view showing the entire structure of a pallet, a base, and the positioning and clamping devices.

The best mode for putting this invention into practical use are described hereafter, with reference to the drawings. As shown in FIG. 1, a work pallet 1 (a clamping object), on which a work piece to be machined is fitted, is positioned and clamped to a base member 2, fixed to the table of a machining tool by means of four sets of positioning and clamping devices 3. Then, the work piece on the pallet 1 is machined. Pallet 1 is made of a nearly square thick plate, and base 2 is made of also a nearly square thick plate. Base 2 can be the table of a machining tool. The four sets of positioning and clamping devices 3 are provided in the four corners of the square pallet 1 and base 2.

The positioning and clamping device 3 will be described next.

The four sets of positioning and clamping devices 3 have the same structure; therefore, only one of positioning and clamping devices 3 is described.

Figure 2:
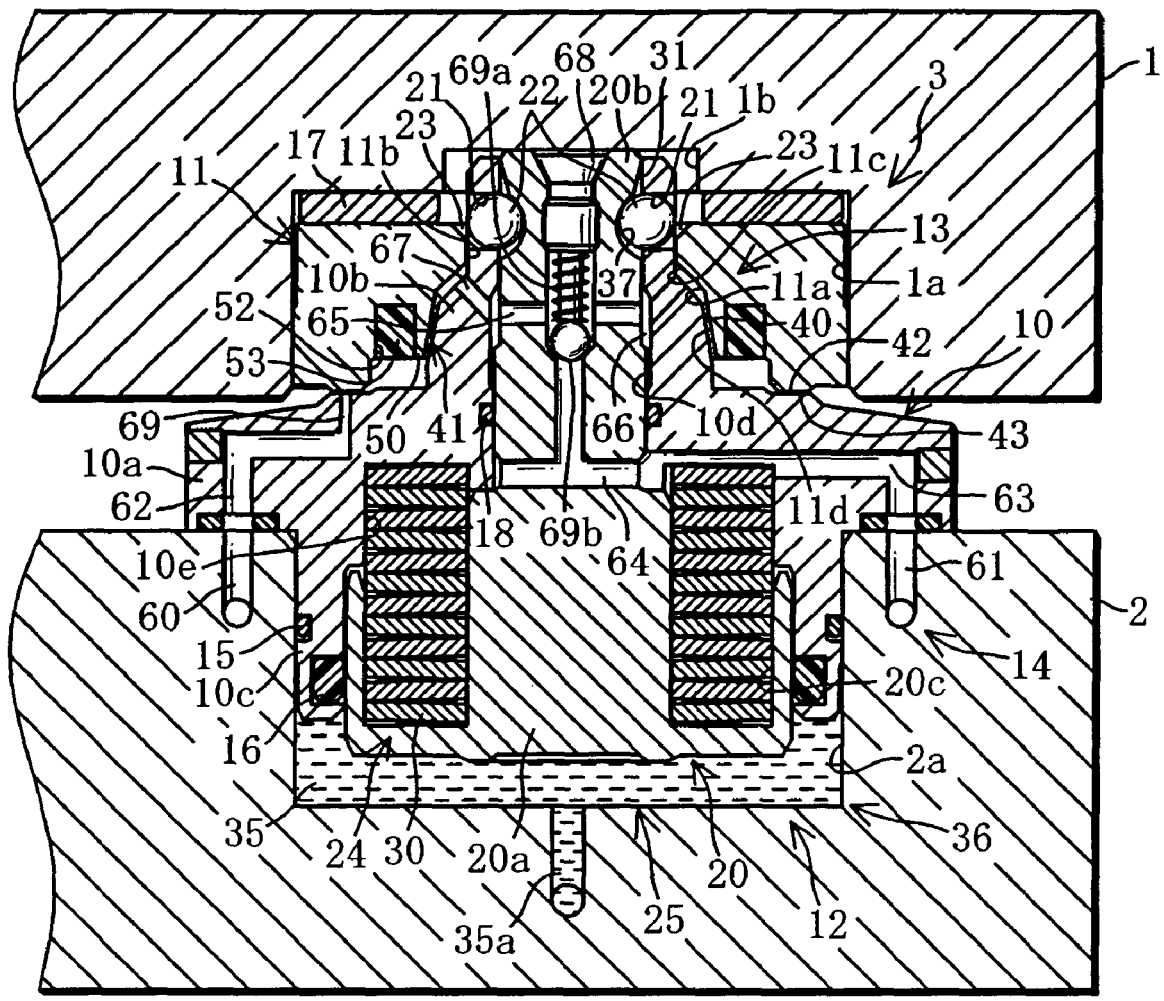
FIG. 2 is a vertical cross-sectional view of the positioning and locking device (in the unclamped state)
Figure 4:
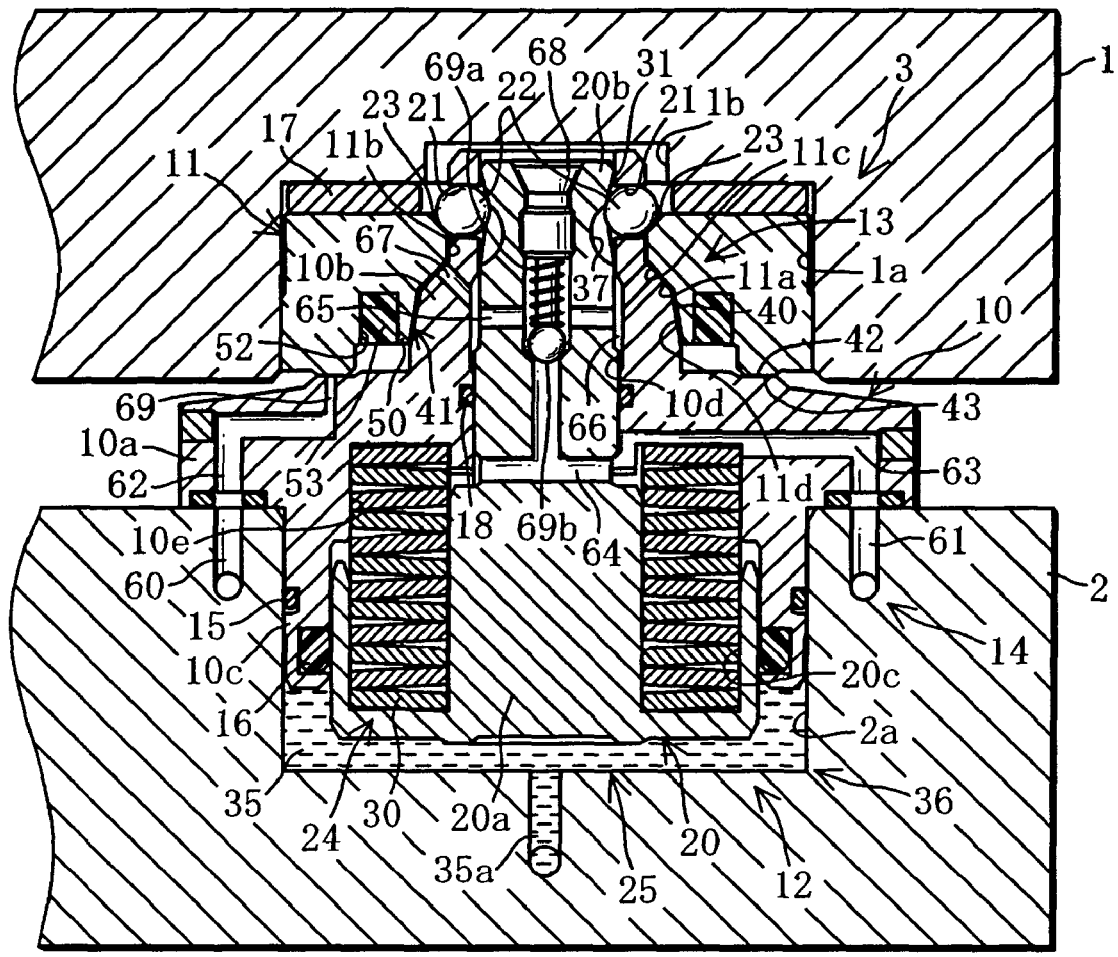
FIG. 4 is a vertical cross-sectional view of the positioning and locking device (in the course of clamping)
Figure 6:
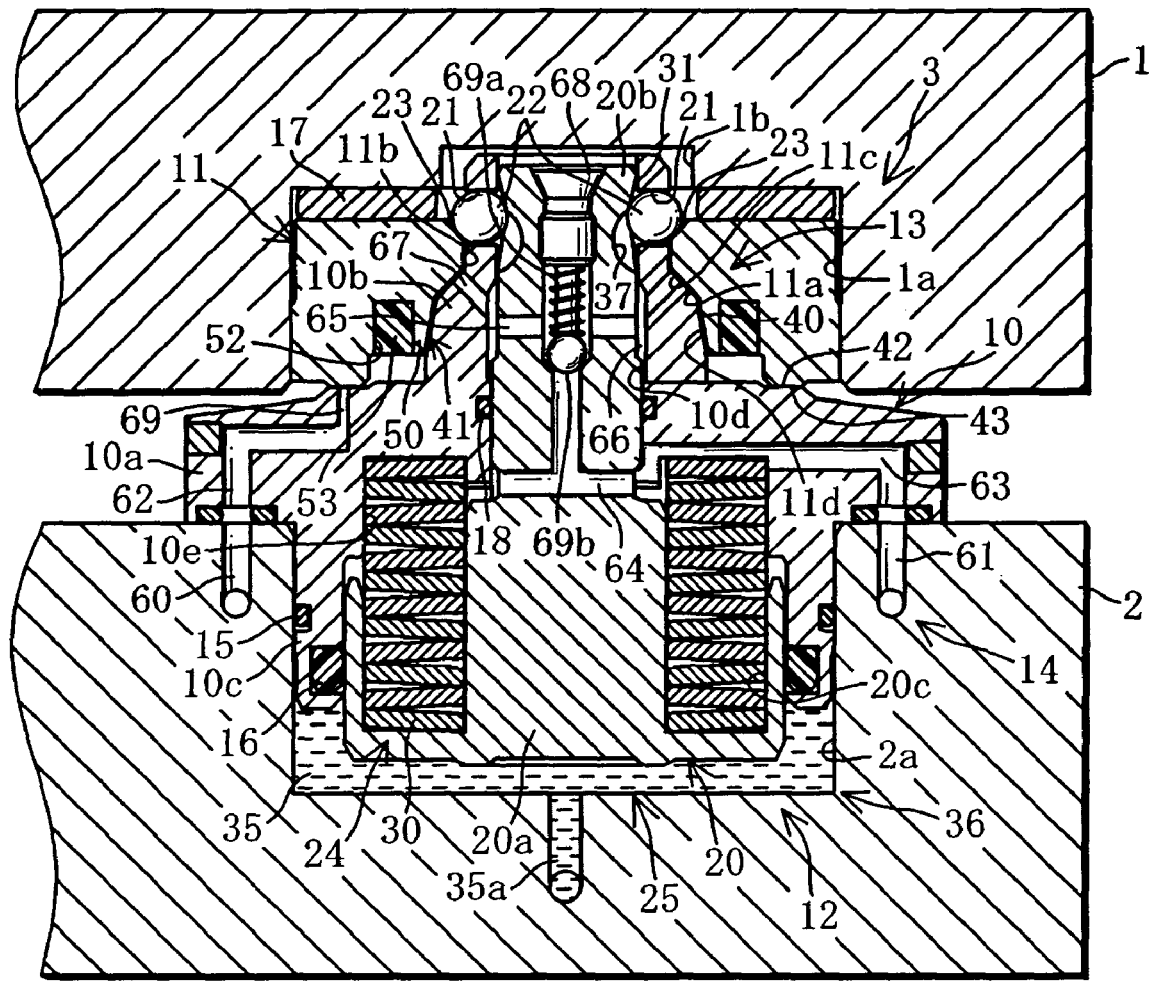
FIG. 6 is a vertical cross-sectional view of the positioning and locking device (in the clamped state)

As shown in FIGS. 2, 4, and 6, the positioning and clamping device 3 comprises a reference member 10, fixed to the base 2, an annular engagement member 11, fitted fixedly in the work pallet 1, so as to be capable of being fitted onto a cylindrical shaft 10b of the reference member 10, a clamping mechanism 12, which pulls down and clamps releasably the pallet 1 to the base 2, a positioning mechanism 13 which positions the pallet 1 in relation to the base 2 in the horizontal and vertical directions, and an air-blowing mechanism 14 which ejects pressurized air for dusting.

The reference member 10, attached to the base 2, has a large diameter part 10a in the middle in the vertical direction, a cylindrical shaft 10b extending upward from the large diameter part 10a, and an annular part 10c protruding from the bottom of the large diameter part 10a. With the annular part 10c inserted in a housing hole 2a, formed in the base 2 from the top, and the large diameter part 10a abutting the top surface of the base 2, the reference member 10 is fastened to the base 2, by multiple bolts through the large diameter part 10a, and the cylindrical shaft 10b protrudes from the base 2. The large diameter part 10a, and cylindrical shaft 10b of the reference member 10, has an axial bore 10d, through which the rod 20b of a piston member 20 is introduced.

An annular receiving surface 42 is formed on the top surface of the large diameter part 10a. An annular tapered surface 40, having a decreasing diameter toward the top, is formed on the outer periphery of the lower portion of the cylindrical shaft 10b. An annular spring housing hole 10e, is formed on the bottom side portion of the large diameter part 10a, inside the annular part 10c. A sealing member 15 for sealing between the annular part 10c and the wall of the housing hole 2a, and a sealing member 16 for sealing between the annular part 10c and the piston 20a of the piston member 20, are fitted to the annular part 10c. An oil chamber 35 is formed in the housing hole 2a, below the annular part 10c and the piston 20a.

The annular engagement member 11 is attached to the pallet 1, in the manner that it is inserted and housed in housing hole 1a formed in pallet 1 from the bottom, and fastened to pallet 1 by multiple bolts, with a height-adjusting shim plate 17 being interposed for height adjustment. An abutting surface 43 is formed at the bottom surface of the annular convex part, formed at the bottom end of the annular engagement member 11. An annular engaging mechanism 41 is formed on the inner periphery side portion of the annular engagement member 11. Pallet 1 has a recess 1b, in the top wall of the housing hole 1a, in the center.

The clamping mechanism 12 will be described next.

As shown in FIGS. 2, 4, 6, and 8 to 12, the clamping mechanism 12 comprises a piston member 20 as a power output member, the rod 20b of which is inserted in the axial bore 10d, formed through the large diameter part 10a and cylindrical shaft 10b of the reference member 10, multiple steel balls 22 (for example, six), which are radially movably held in multiple retention holes 21 (for example, six), formed at the top portion of the cylindrical shaft 10b, multiple engagement recesses 23 (for example 12, six of which engage with the multiple steel balls 22), which are formed at the top end of the inner periphery part of the annular engagement member 11, and, with which the multiple steel balls 22 make a line contacts when the annular engagement member 11 is fitted on the cylindrical shaft 10b, a clamping drive means 24, which moves the piston member 20 away from pallet 1 (downward), so that the multiple steel balls 22 are engaged with the multiple engagement recesses 23 to clamp the pallet 1 to the base 2, and an unclamping means 25, which moves the piston member 20 toward pallet 1 (upward), so that the multiple steel balls 22 are disengaged from the multiple engagement recesses 23, to unclamp the pallet 1 from the base 2.

The piston member 20 has a piston 20a, and a rod 20b extending upward from the piston 20a. The piston 20a is fitted slidably in the annular part 10c of the reference member, and the rod 20b is inserted in the axial bore 10d of the large diameter part 10a and cylindrical shaft 10b of the reference member 10. A sealing member 18 provides a seal between the rod 20b and the reference member 10. An annular spring housing hole 20c is formed in the piston 20a, from the top. Multiple disc springs 30 are compressed and housed in the spring housing hole 20c, and spring housing hole 10e of the reference member 10. The piston member 20 is pressed elastically downward relative to the reference member 20, by the disc springs 30.

The multiple retention holes 21 are formed in the cylindrical shaft 10b at equal intervals in the circumferential direction (for example at intervals of 60 degrees). Each retention hole 21 has a circular cross-section, having a decreasing diameter, radially, toward the outer end, where the diameter is smaller than the steel balls 22, so that the steel balls 22 do not fall out of the retention holes 21. The retention holes 21 restrict the movement of the steel balls 22 to a nearly radial direction of the cylindrical shaft 10b. The multiple engagement recesses 23 are formed in the annular engagement member 11, at equal intervals in the circumferential direction (for example at intervals of 30 degrees). Each engagement recess 23 has a partially cylindrical surface, of which the central axis extends obliquely downward toward the central axis of the annular engagement member 11.

The clamping drive means 24 has multiple retention holes 21, which hold the multiple steel balls 22, and restrict their movement to the nearly radial direction of the cylindrical shaft 10b, multiple disc springs 30, which press elastically the piston member 20 downward, and multiple (for example, six) oblique recesses 31, formed at the top part of the rod 20b of the piston member 20, to push the multiple steel balls 22 outward, radially. The unclamping means 25 has a hydraulic cylinder 36, with an oil chamber 35 and a piston member 20, a hydraulic supply device (not shown), which supplies hydraulic pressure (pressurized oil) to the oil chamber 35 via an oil passage 35a, formed in base 2, and multiple (for example, six) escape recesses 37, formed at the top part of the rod 20b of the piston member 20, to retract the multiple steel balls 22, inward, radially. The multiple oblique recesses 31 are continued respectively from the multiple escape recesses 37, upward. The oblique recesses 31 and escape recesses 37 are formed at equal intervals in the circumferential direction (for example, at intervals of 60 degrees).

With hydraulic pressure being supplied to the oil chamber 35 by a hydraulic supply device, the piston member 20 is raised to the highest position. In this state, the multiple escape recesses 37 of the rod 20b face the multiple retention holes 21 of the cylindrical shaft lob, whereby the multiple steel balls 22 can be retracted partially into the multiple escape recesses 37. When the hydraulic pressure is released from the oil chamber 35, by the hydraulic supply device, the multiple disc springs 30 move the piston member 20 downward, and the multiple steel balls 22 are pushed outward, radially, by the multiple oblique recesses 31 of the rod 20b, and engaged with the multiple engagement recesses 23, producing a clamping force, which strongly pulls down and clamps pallet 1 to the base 2. When the hydraulic pressure is supplied to the oil chamber 35 by the hydraulic supply device in this state, by the unclamping means 25, the piston member 20 is moved upward by the hydraulic pressure, and the multiple steel balls 22 are retracted into the multiple escape recesses 37, and disengaged from the multiple engagement recesses 23, respectively, unlocking the pallet 1 from the base 2.

The positioning mechanism 13 will be described next.

As shown in FIGS. 2 to 12, the positioning mechanism 13 has an annular tapered surface 40, which is formed on the outer periphery of the lower portion of the cylindrical shaft 10b, for horizontally positioning the pallet 1, and has a decreasing diameter toward the axial tip (top) of the cylindrical shaft 10b, an annular engaging mechanism 41, which is formed on the inner periphery side portion of the annular engagement member 11 to engage with the annular tapered surface 40, and is capable of elastically deforming in the radial direction in an engaged state with the annular tapered surface 40, a receiving surface 42, formed on the reference member fixed on the base 2, for positioning on the bottom of the pallet 1 in the vertical direction, and an abutting surface 43, provided on the bottom of the annular engagement member 11, for abutting the receiving surface 42, when the engaging mechanism 41 is engaged tightly with the annular tapered surface 40.

A center bore 11a, for introducing the cylindrical shaft 10b, is formed in the annular engagement member 11, at the central portion. A small diameter bore 11b, through which the cylindrical shaft 10b is introduced, is formed at the upper part of the center bore 11a. The inner ends of the multiple engagement recesses 23 are located, radially, in the small diameter bore 11b. A tapered guide bore 11c, having an increasing diameter to the bottom, is continued downward from the small diameter bore 11b. A tapered bore 11d, having an increasing diameter toward the bottom, is continued downward from the tapered guide bore 11c. The inner surface of the tapered bore 11d forms the inner surface of the tapered ring portion 50 of the engaging mechanism 41.

Figure 9:
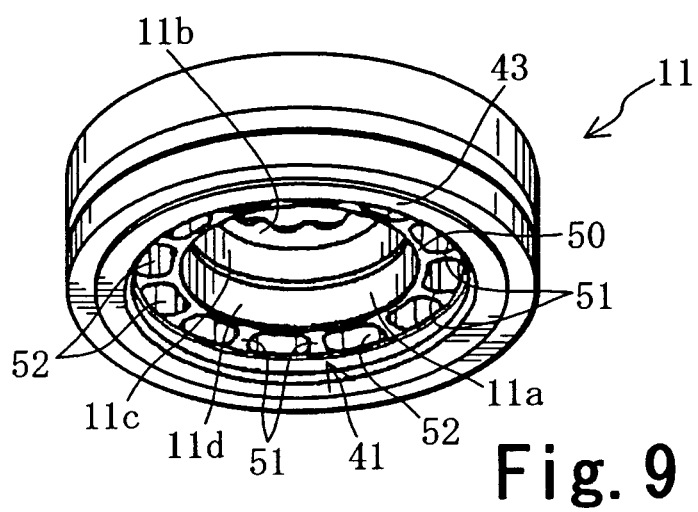
FIG. 9 is a perspective view of the annular engagement member.
Figure 10:
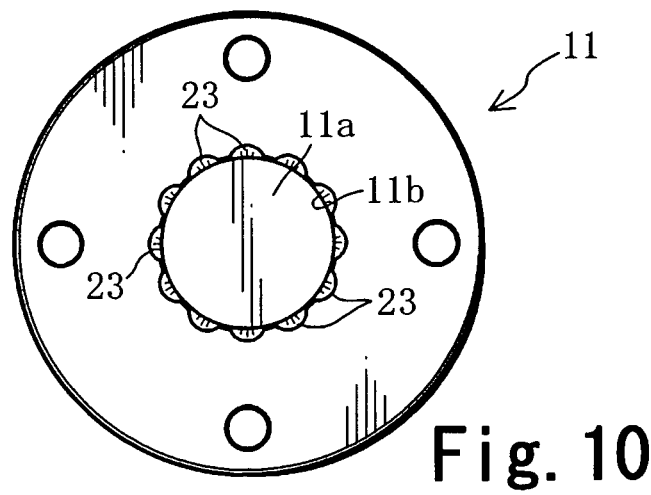
FIG. 10 is a plane view of the annular engagement member.
Figure 11:
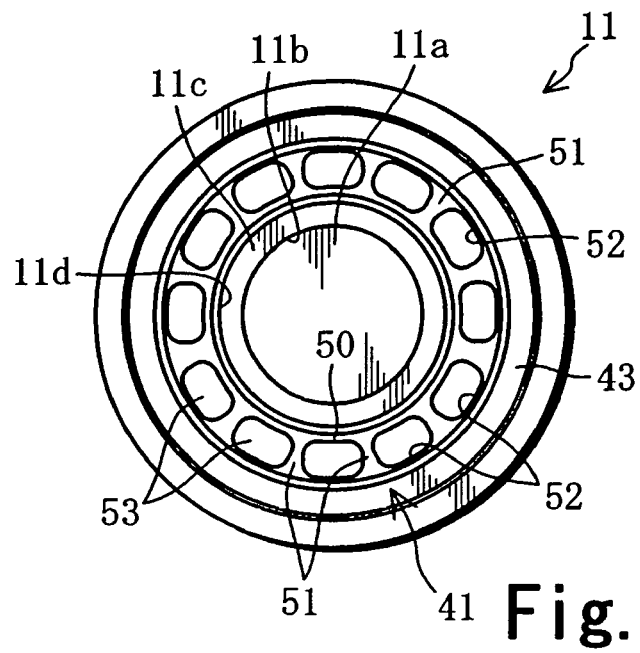
FIG. 11 is a bottom view of the annular engagement member.
Figure 12:
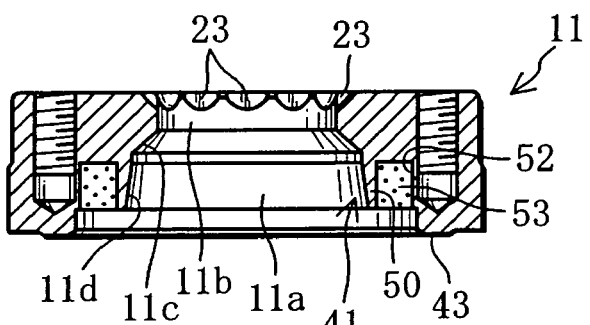
FIG. 12 is a vertical cross-sectional view of the annular engagement member.
Figure 13:
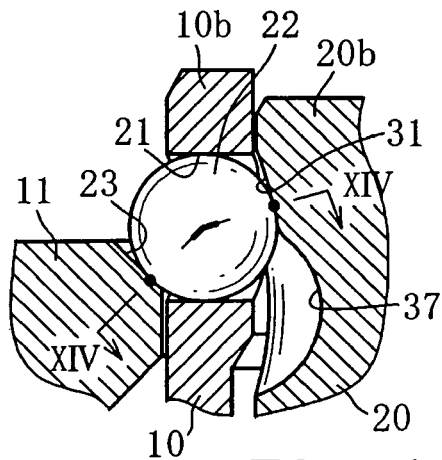
FIG. 13 is a vertical cross-sectional view of the core part of the clamping mechanism.
Figure 14:
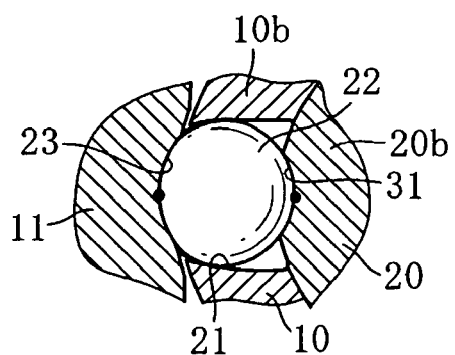
FIG. 14 is a cross-sectional view at XIV-XIV line in FIG. 13.

As shown in FIGS. 2, 4, 6, and 8 to 12, the engaging mechanism 41 has a tapered ring portion 50, capable of making a face contact with the annular tapered surface 40 of the cylindrical shaft 10b, multiple (for example, 12) ribs 51, which extend outward, radially, from the tapered ring portion 50, and multiple (for example, 12) holes 52, formed on the outer side of the tapered ring portion 50, between the multiple ribs 51. The tapered ring portion 50 and the multiple ribs 51, are formed integrally with the annular engagement member 11. The multiple ribs 51 and multiple holes 52, are formed alternately, and at equal intervals, in the circumferential direction. The multiple holes 52 are formed in the annular engagement member 11, from the bottom, and filled with an elastically deformable synthetic resin material 53. FIG. 9 shows a midway state before synthetic resin material 53 is filled.

As shown in FIGS. 2, 4, and 6, the air-blowing mechanism 14 ejects pressurized air to disperse cutting powder from the outer surface of the cylindrical shaft 10b, and from the inner surface of the inner engagement member 11, when the pallet 1 is positioned to clamp it to the base 2. The air-blowing mechanism 14 has an air passage 61, formed in the base 2 and connected to an external pressurized air supply device, an air passage 63 within the reference member 10, air passages 64 and 65, within the rod 20b of the piston member 20, an annular groove 66, and blowing nozzles 67 and 68. The downstream end of the air passage 64 is closed with a ball 69b, which is pressed downward by a spring 69a, thereby preventing machining oil from entering the air passage 64. When pressurized air is supplied, the ball 69b is raised to open the downstream end of the air passage 64. Air passages 60, 62, and 69 are air sensor passages for supplying pressurized air to check whether the abutting surface 43 of the annular engagement member 11, abuts and is seated onto the receiving surface 42 of the base 2.

The operation of the positioning and clamping device 3 will be described hereafter.

As shown in FIG. 2, for setting pallet 1 on base 2, hydraulic pressure (pressurized oil) is supplied to the oil chamber 35, so that the clamping mechanism 12 is switched to the unclamped state. In this state, the hydraulic pressure supplied to the oil chamber 35 causes the piston member 20 to raise to the highest position in opposition to the pressing force of the multiple disc springs 30. Then, the top end of the rod 20b slightly protrudes above the cylindrical shaft 10b, and the multiple escape recesses 37 of the rod 20b face the multiple retention holes 21 of the cylindrical shaft 10b, from inside. At this point, the multiple steel balls 22, held in the multiple retention holes 21, move inward, radially, and are retracted partially into the multiple escape recesses 37. Consequently, the annular engagement member 11, of the pallet 1 placed over base 2, is positioned relative to the corresponding reference member 10, and pallet 1 is lowered and set, with the annular engagement member 11 being fitted onto the cylindrical shaft 10b.

Figure 3:
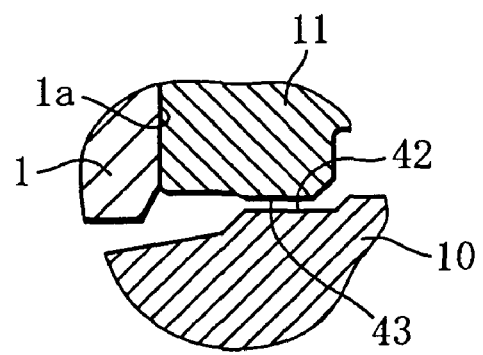
FIG. 3 is a partial enlarged view of the positioning and locking device in FIG. 2.

As shown in FIG. 2, with pallet 1 being set on base 2, the top end of the rod 20b that protrudes above the cylindrical shaft 10b abuts the top wall of the recess 1b of the pallet 1, whereby pallet 1 is received and supported by the rod 20b. Here, the engaging mechanism 41 of the annular engagement member 11, is not pressed against the annular tapered surface 40 of the cylindrical shaft 10b, nor elastically deformed in the radial direction. As shown in FIG. 3, there is a gap between the receiving surface 42 of the reference member 10, and the abutting surface 43 of the annular engagement member 11. At this point, the air-blowing mechanism 14 ejects pressurized air through the multiple blowing nozzles 67 and 68 to disperse cutting powder, while, or after, pallet 1 is set on base 2.

Figure 5:
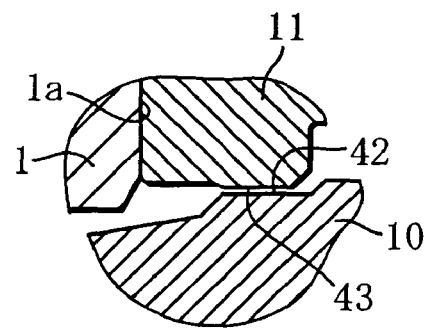
FIG. 5 is a partial enlarged view of the positioning and locking device in FIG. 4.

Next, the clamping drive means 24 is activated to position and clamp pallet 1 to base 2. When the hydraulic pressure is released from the oil chamber 35, the piston member 20 is lowered by the multiple disc springs 30. When the piston member 20 is lowered, pallet 1 is also lowered. Then, the top end of the rod 20b is retracted into the axial bore 10d of the cylindrical shaft 10b, and the multiple steel balls 22 are pushed outward, radially, by the multiple slanted recesses 31 of the rod 20b, and engaged with the multiple engagement recesses 23 of the annular engagement member 11. First, as shown in FIG. 4, the engaging mechanism 41 of the annular engagement member 11, is engaged with the annular tapered surface 40 of the cylindrical shaft 10b. Here, as shown in FIG. 5, there is still a small gap between the receiving surface 42 of the reference member 10, and the abutting surface 43, of the annular engagement member 11.

Figure 7:
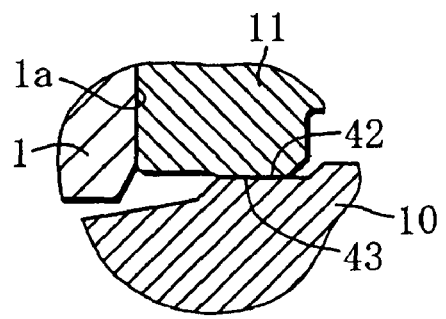
FIG. 7 is a partial enlarged view of the positioning and locking device in FIG. 6.
Figure 8:
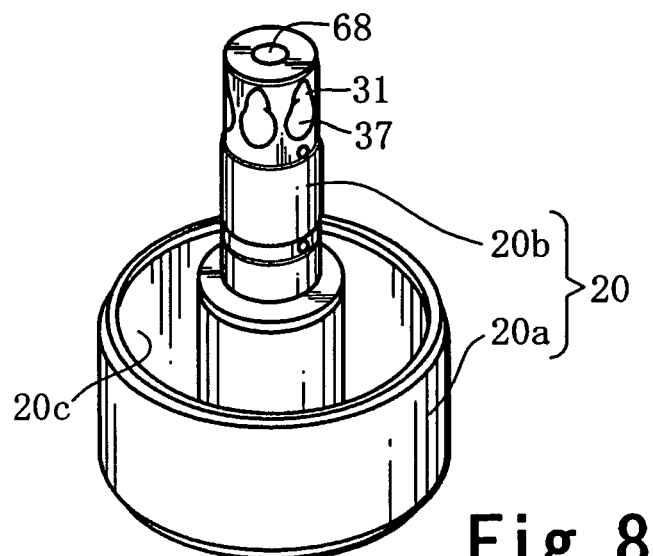
FIG. 8 is a perspective view of the piston member.

When the piston unit 20 is further lowered, the multiple steel balls 22 are pushed outward, radially, by the multiple slanted recesses 31 of the rod 20b. The multiple steel balls 22 engaged with the multiple engagement recesses 23, transmit a clamping force to the annular engagement member 11, and, accordingly, to pallet 1, whereby pallet 1 is pulled down to base 2. Then, as shown in FIGS. 6 and 7, the engaging mechanism 41 of the annular engagement member 11, is elastically deformed outward, radially, and strongly engaged with, and pressed tightly against, the annular tapered surface 40 of the cylindrical shaft 10b, whereby pallet 1 is positioned accurately in the horizontal direction relative to base 2. With the abutting surface 43 of the annular engagement member 11, abutting, and being pressed tightly against, the receiving surface 42 of the reference member 10, pallet 1 is positioned accurately in the vertical direction in relation to the base 2.

As shown in FIG. 2, it often occurs that pallet 1 is placed over base 2, without the central axes of the cylindrical shaft 10b and annular engagement member 11 being aligned. In such cases, when the engaging mechanism 41 is engaged with the annular tapered surface 40 of the cylindrical shaft 10b, for pulling down and clamping pallet 1 to the base 2, the central axes of the cylindrical shaft 10b and annular engagement member 11, are first aligned before the engaging mechanism 41 is elastically deformed. Then, the engaging mechanism 41 is elastically deformed, and pressed against the annular tapered surface 40. For unclamping pallet 1 from the base 2, hydraulic pressure is supplied to the oil chamber 35. The piston member 20 is raised, and pallet 1 is pushed up by the rod 20b, reliably disengaging engaging mechanism 41 from the cylindrical shaft 10b.

The positioning and clamping device 3, described above, has the following advantages. The positioning mechanism 13 comprises the annular tapered surface 40, which is formed on the outer periphery of the cylindrical shaft 10b for positioning pallet 1 in the horizontal direction, and has a decreasing diameter toward the axial tip of the cylindrical shaft 10b, and the annular engaging mechanism 41, which is formed on the inner periphery side portion of the annular engagement member 11, to engage with the annular tapered surface 40, and is elastically deformed in the radial direction, as a result of engagement with the annular tapered surface 40. Therefore, when pallet 1 is pulled down and clamped to the base 2, the annular engaging mechanism 41 is elastically deformed outward, radially, and pressed tightly against the annular tapered surface 40, whereby pallet 1 can be reliably and accurately positioned in relation to the base 2 in the horizontal direction.

Further, the positioning mechanism 13 has the receiving surface 42 formed on the reference member 10 on the base for positioning pallet 1 in the vertical direction, and the abutting surface 43 formed on the annular engagement member 11, for abutting the receiving surface 42 when the engaging mechanism 41 is engaged with the annular tapered surface 40, whereby pallet 1 is reliably and accurately positioned in the vertical direction in relation to the base 2.

Particularly, the engaging mechanism 41 has the tapered ring portion 50, which makes face contact with the annular tapered surface 40, multiple ribs 51, extending outward, radially, from the tapered ring portion 50, and multiple holes 52, formed on the outer side of the tapered ring portion 50, between the multiple ribs 51. Therefore, when pallet 1 is pulled down and clamped to the base 2, the elastic deformation of the engaging mechanism 41 is facilitated. The multiple ribs 51 are subject to compressive elastic deformation so as to enlarge the entire tapered ring portion 50, ensuring reliable and appropriate elastic deformation in the radial direction of the engaging mechanism 41. Hence, it is ensured that the tapered ring portion 50 is pressed tightly against the annular tapered surface 40 of the cylindrical shaft 10b.

Here, in comparison between the present invention and the seating device of Patent Document 2, under the same clamping condition, the tapered cone of Patent Document 2 has an elastic deformation rate (amount) of approximately 30 μm, while the engaging mechanism 41 of the present invention, has an elastic deformation rate (amount) of approximately 80 μm. This larger elastic deformation rate allows the components of the present invention to have a larger production tolerance. When the elastic deformation rate is small, and the components have larger production tolerances, the horizontal positioning surfaces of the base and the pallet may not be pressed against each other; instead, only the tapered surfaces for horizontal positioning are pressed against each other, or a gap may be created between these tapered surfaces. Therefore, the components have to be produced with high accuracy, using both cost and time. The present invention can resolve these problems.

When the multiple ribs 51 are provided, the engaging mechanism 41 has appropriate rigidity. Therefore, when the engaging mechanism 41 is engaged with the cylindrical shaft 10b, for pulling down and clamping pallet 1 to the base 2, without the central axes of the cylindrical shaft 10b and annular engagement member 11 being aligned, the central axes of the cylindrical shaft 10b and annular engagement member 11 are aligned first, as a result of the engagement, before the engaging mechanism 41 is elastically deformed. Then, the engaging mechanism 41 is elastically deformed and pressed against the annular tapered surface 40.

In comparison between the present invention and the positioning and clamping device of Patent Document 3, the present invention allows a pallet having a weight three times heavier than the device of Patent Document 3 to be mounted on a base, while also enabling the positioning accuracy to be ensured over an extended time.

Consequently, a heavier work pallet 1 can be positioned in relation to the base 2, with significantly increased accuracy. And with the engaging mechanism 41 being formed integrally with the annular engagement member 11, the number of components can be decreased for reduced production cost. Furthermore, abrasion, which adversely affects the positioning accuracy, can be reduced; higher accuracy of positioning, after prolonged and repeated use under the influence of machining oil and cutting powder during machining, can be maintained without functional deterioration; and with the multiple holes 52 being manufactured on the thick annular portion, the tapered ring portion 50 and the multiple ribs 51 are easily produced integrally, thereby reducing production costs.

In the clamping mechanism 12, the clamping drive means 24 moves the piston member 20 downward, with the annular engagement member 11 attached to pallet 1 being fitted on the cylindrical shaft 10b attached to the base 2. Subsequently, the multiple steel balls 22, held in the cylindrical shaft 10b by the piston member 20, are reliably pushed outward, radially, by the multiple slanted recesses 31, of the rod 20b, and engaged, and make a line contact with the multiple engagement recesses 23 of the annular engagement member 11, whereby pallet 1 is pulled down and clamped to the base 2. In this state, the unclamping means 25 moves the piston member 20 upward, so that the multiple steel balls 22 are moved inward, radially, and reliably retracted partially into the multiple escape recesses 37 of the rod 20b. They are then disengaged from the multiple engagement recesses 23 of the annular engagement member 11, whereby pallet 1 is unclamped from the base 2.

During clamping, the engagement recesses 23, with which the steel balls 22 are engaged, receive a significantly large force. However, the engagement recesses 23 have a partially cylindrical shape; therefore, the steel balls 22 make a arc line contact with the engagement recesses 23. Compared with making a point contact with the engagement recesses 23, this larger contact area with the engagement recesses 23 does not cause the engagement recesses 23 to have even a trace of contact with the steel balls 22, after prolonged and repeated use, whereby the stable clamped state can be maintained.

Another embodiment will be described hereafter.

A positioning and clamping device 3A is a partially modified version of the positioning and clamping device 3. Basically, the explanation is made using the same reference numbers for the same components, as for the positioning and clamping device 3.

Figure 15:
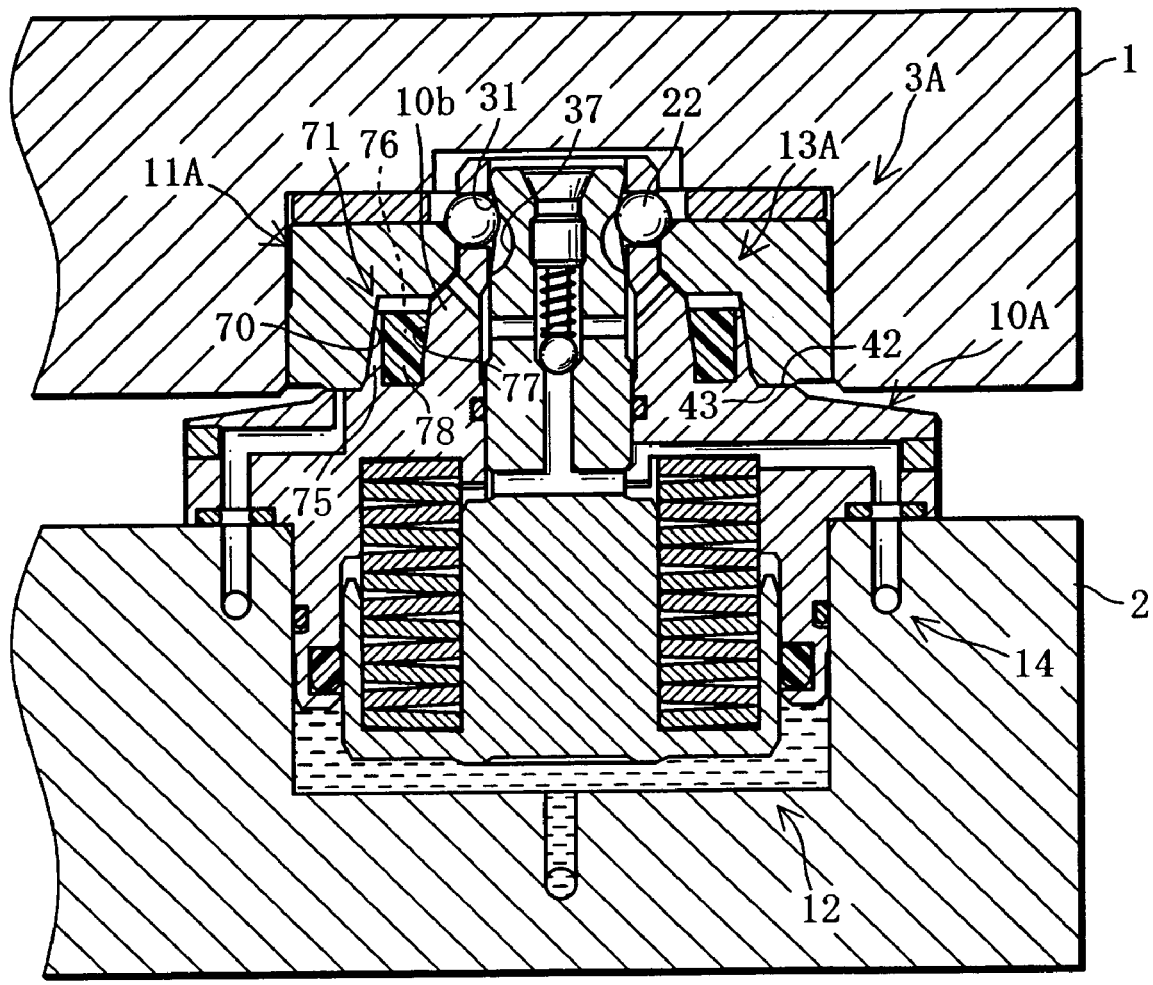
FIG. 15 is a vertical cross-sectional view of the positioning and locking device.

As shown in FIG. 15, the positioning and clamping device 3A comprises a reference member 10A fixed to the base 2, an annular engagement member 11A, fixed to pallet 1, to be fitted on the cylindrical shaft 10b of the reference member 10A, a clamping mechanism 12 which pulls down and clamps pallet 1 to the base 2, a positioning mechanism 13A which positions pallet 1 in the horizontal and vertical directions in relation to the base 2, and an air-blowing mechanism 14 which ejects pressurized air for dusting.

The positioning and clamping mechanism 3A has an annular tapered surface 70, which is formed on the inner periphery of the annular engagement member 11A, for positioning pallet 1 in the horizontal direction, and has a decreasing diameter toward the axial tip (top) of the cylindrical shaft 10b, an annular engaging mechanism 71, which is formed on the outer periphery side portion of the cylindrical shaft 10b, to engage with the annular tapered surface 70, and is elastically deformed in the radial direction, as a result of engagement with the annular tapered surface 70, a receiving surface 42, formed on the reference member 10A fixed to the base 2 for positioning pallet 1 in the vertical direction, and an abutting surface 43, formed on the annular engagement member 11A, for abutting the receiving surface 42, when the engaging mechanism 71 is engaged with the annular tapered surface 70.

The engaging mechanism 71 has a tapered ring portion 75, which makes a face contact with the annular tapered surface 70 of the annular engagement member 11A, multiple ribs 76 extending inward, radially, from the tapered ring portion 75, and multiple holes formed on the inner side of the tapered ring portion 75, between the multiple ribs 76. The tapered ring portion 75, and multiple ribs 76, are formed integrally with the cylindrical shaft 10b, and the multiple holes 77 are filled with an elastically deformable synthetic resin material 78.

In the positioning and clamping device 3A, when pallet 1 is pulled down and clamped to the base 2, the annular engaging mechanism 71 is elastically deformed inward, radially, and pressed tightly against the annular tapered surface 70, whereby pallet 1 is positioned in the horizontal direction in relation to the base 2. Having the tapered ring portion 75, multiple ribs 76, and multiple holes 77, the engaging mechanism 71 is easily elastically deformed, when pallet 1 is pulled down and clamped to the base 2. The engaging mechanism 71 is engaged with the annular engagement member 11A, and reliably elastically deformed inward, radially, whereby the tapered ring portion 75 is reliably pressed tightly against the annular tapered surface 70. For the rest, the same advantages and efficacy as the positioning and clamping device 3 of Embodiment 1 are obtained.

The positioning and clamping devices 3 and 3A can be modified as follows.

1] Multiple steel balls 22 make a face contact with multiple engagement recesses 33 respectively, when the cylindrical shaft 10b is fitted on the annular engagement member 11 or 11A. In such a case, the engagement recesses 23 are formed to have a partially spherical shape.

2] The piston member 20 is moved downward for generating a clamping force, by springs other than disc springs, or by fluid pressure, such as hydraulic pressure, instead of by springs such as disc springs. Further, the piston member 20 is moved upward for unclamping by springs, such as disc springs, instead of by hydraulic pressure.

3] The annular engagement member 11 or 11A is formed integrally with the pallet 1.

4] The synthetic resin material 58 or 78 is omitted.

5] The clamping mechanism 12, which pulls down and clamps pallet 1 to the base 2, uses one of various known clamping mechanisms. For example, to clamp the pallet 1 to the base 2, a pull-stud attached to pallet 1 is pulled down by a different clamping drive means attached to the base 2.

6] One or more sets of the positioning and clamping devices 3 or 3A, which positions and clamps pallet 1 to the base 2, can be used; it is not necessarily that it be four sets.

7] The present invention is not necessarily applied to all positioning and clamping devices to position and clamp pallet 1. For example, when four sets are used, the present invention is applied to two positioning and clamping devices 3 or 3A which are disposed on diagonally opposing positions, and the other positioning and clamping devices are used to position pallet 1, only in the vertical direction.

8] A positioning and clamping system can be constituted by one set of the positioning and clamping devices 3 or 3A of the present invention, two sets of a first device which positions pallet 1 in the vertical direction only, in relation to the base 2, and a second device which positions pallet 1 in the vertical direction in relation to the base 2, and in the rotation direction in the horizontal plane around the positioning and clamping devices 3 or 3A.

In such a case, the positioning and clamping device 3 or 3A, and the second device, are placed in diagonally opposite corners, and the two sets of the first device are placed in the other diagonally opposite corners. The second device basically has the same structure as the positioning and clamping device 3 or 3A, or the positioning device described in 9] below, except that the cylindrical shaft is cut off on both sides in the diagonal direction, through the positioning and clamping device 3 or 3A. Then, the cylindrical shaft and annular engagement member of the second device can be moved, relatively, in the diagonal direction, when the annular engagement member is fitted on the cylindrical shaft. Therefore, the mounting error of the base 2 and pallet 1, or the male part (the reference member [cylindrical shaft]) and the female part (annular engagement member) of the positioning and clamping device 3 or 3A is tolerated in the diagonal direction, and pallet 1 is reliably positioned and clamped to the base 2, in the horizontal and vertical directions.

9] Omitting the clamping mechanism 12, this invention can be used as a positioning device. In such a case, the positioning device comprises a protruding shaft attached to the base 2, an annular engagement member attached to a clamping object to be fitted on the shaft, an annular tapered surface formed on the outer periphery of the shaft for positioning pallet 1 in the horizontal direction, and has a decreasing diameter toward the axial tip of the shaft, and an annular engaging mechanism that is formed on the inner periphery side portion of the annular engagement member to engage with the annular tapered surface, and is elastically deformed in the radial direction, as a result of engagement with the tapered surface, wherein the engaging mechanism has a tapered ring portion that makes a face contact with the annular tapered surface, and multiple ribs extending outward, radially, from the tapered ring portion.

10] The positioning and clamping devices 3 or 3A can be used to position and clamp various other clamping objects relative to a base, such as a metal mold positioned and clamped to a base, such as a movable or a fixed board. The same is true for the positioning device described above.

What is claimed is:

1. A positioning and clamping device, comprising:
    a clamping mechanism that pulls down and clamps a clamping object for fitting a work piece to be machined or a metal mold, to a base member;
    a protruding cylindrical shaft provided on the base member
    an annular engagement member provided on the clamping object so as to be capable of being fitted on the cylindrical shaft;
    a positioning mechanism that positions the clamping object in the horizontal and vertical directions in relation to the base member, said positioning mechanism comprising an annular tapered surface that is formed on an outer periphery of the cylindrical shaft for positioning the clamping object in the horizontal direction, and that has a decreasing diameter toward an axial tip of the cylindrical shaft, and an annular engaging mechanism that is formed on an inner periphery side portion of the annular engagement member, so as to be capable of engaging with the annular tapered surface and of elastically deforming in the radial direction, in an engaged state with the annular tapered surface, said engaging mechanism including a tapered ring portion capable of making a face contact with the annular tapered surface, and multiple ribs being circumferentially spaced apart and extending radially outward from the tapered ring portion.

2. A positioning and clamping device, comprising:
    a clamping mechanism that pulls down and clamps a clamping object for fitting a work piece to be machined or a metal mold to a base member;
    a protruding cylindrical shaft provided on the base member, and an annular engagement member provided on the clamping object so as to be capable of being fitted on the cylindrical shaft;
    a positioning mechanism that positions the clamping object in the horizontal and vertical directions in relation to the base member, said positioning mechanism comprising an annular tapered surface that is formed on an inner periphery of the annular engagement member for positioning the clamping object in the horizontal direction, and that has a decreasing diameter toward an axial tip of the cylindrical shaft, and an annular engaging mechanism that is formed on an outer periphery side portion of the cylindrical shaft, so as to be capable of engaging with the annular tapered surface and of elastically deforming in the radial direction, in a engaged state with the annular tapered surface, said engaging mechanism including a tapered ring portion capable of making a face contact with the annular tapered surface, and multiple ribs being circumferentially spaced apart and extending radially inward from the tapered ring portion.

3. The positioning and clamping device according to claims 1 or 2, wherein the engaging mechanism has multiple holes formed on the outer or inner side of the tapered ring portion, between the multiple ribs.

4. The positioning and clamping device according to claim 3, wherein said holes are filled with elastically deformable synthetic resin material.

5. The positioning and clamping device according to claims 1 or 2, wherein the positioning mechanism has a receiving surface provided on the base member for positioning the clamping object in the vertical direction, and an abutting surface provided on the annular engagement member for abutting the receiving surface, when the engaging mechanism is engaged with the annular tapered surface.

6. The positioning and clamping device according to claims 1 or 2, wherein the clamping mechanism comprises: a power output member being inserted in an axial bore of the cylindrical shaft; multiple steel balls that are radially movably held in multiple retention holes, respectively, of the cylindrical shaft; multiple engagement recesses formed in the annular engagement member so that the multiple steel balls can make a face contact or a line contact with them, when the annular engagement member is fitted on the cylindrical shaft; a clamping drive means that moves the power output member away from the clamping object, so that the multiple steel balls are engaged with the multiple engagement recesses respectively, to clamp the clamping object to the base member; and an unclamping means that moves the power output member toward the clamping object, so that the multiple steel balls are disengaged from the multiple engagement recesses respectively, to unclamp the clamping object from the base member.

7. The positioning and clamping device according to claim 6, wherein the engagement recesses have a partially spherical shape or partially cylindrical shape.

8. The positioning and clamping device according to claim 7, wherein the unclamping means has multiple escape recesses formed in the power output member, to retract the multiple steel balls inward, radially, and the clamping drive means has multiple slanting recesses formed continuously from the multiple escape recesses in the power output member, to push the multiple steel balls outward, radially.

9. A positioning device that positions a clamping object for fitting a work piece to be machined or a metal mold, relative to a base member, the positioning device comprising:
    a protruding shaft provided on the base member; an annular engagement member provided on the clamping object, so as to be fitted on the shaft; an annular tapered surface that is formed on the outer periphery of the shaft for positioning the clamping object in the horizontal direction and has a decreasing diameter toward the axial tip of the shaft; and an annular engaging mechanism that is formed on an inner periphery side portion of the annular engagement member, so as to be capable of engaging with the annular tapered surface and of elastically deforming in the radial direction, in an engaged state with the annular tapered surface, said engaging mechanism including a tapered ring portion capable of making a face contact with the annular tapered surface, and multiple ribs being circumferentially spaced apart and extending radially outward from the tapered ring portion.

10. A positioning and clamping device, comprising:

a clamping object for fitting a workpiece to be machined or a metal mold;

a base member including a protruding cylindrical shaft;

a clamping mechanism that pulls down and clamps the clamping object for fitting a work piece to be machined or a metal mold, to said base member, said base member including a protruding cylindrical shaft; an annular engagement member provided on the clamping object which is fittable on the cylindrical shaft; and a positioning mechanism that positions the clamping object in horizontal and vertical directions in relation to the base member, the positioning mechanism including an annular tapered surface and an annular engagement mechanism engageable with the annular tapered surface, said annular tapered surface being formed on a one of an outer periphery of the cylindrical shaft or an inner periphery of the annular engagement member, and said annular engaging mechanism being formed on a remaining one of said inner periphery of the annular engagement member or the outer periphery of the cylindrical shaft, said annular tapered surface presenting a decreasing diameter toward an axial tip of the cylindrical shaft, said annular engaging mechanism being elastically deformable in a radial direction in an engaged state with the annular tapered surface, said annular engaging mechanism including a tapered ring portion contactable with the annular tapered surface and including ribs being circumferentially spaced apart and extending radially from the tapered ring portion so as to define open spaces therebetween.

11. A positioning device that positions a clamping object for fitting a work piece to be machined or a metal mold, relative to a base member, comprising:

a protruding shaft provided on the base member;

an annular engagement member provided on the clamping object, so as to be fittable on the shaft; and an annular engagement mechanism engageable with an annular tapered surface formed on a one of an outer periphery of the cylindrical shaft or an inner periphery of the annular engagement member, and said annular engaging mechanism being formed on a remaining one of said inner periphery of the annular engagement member or the outer periphery of the cylindrical shaft, said annular tapered surface presenting a decreasing diameter toward an axial tip of the cylindrical shaft, said annular engaging mechanism being elastically deformable in a radial direction in an engaged state with the annular tapered surface, said annular engaging mechanism including a tapered ring portion contactable with the annular tapered surface and including ribs being circumferentially spaced apart and extending radially from the tapered ring portion so as to define open spaces therebetween.

\* \* \* \* \*